T. SELMERSHEIM.
MACHINE FOR REPRODUCING THE CONFIGURATION OF OBJECTS.
APPLICATION FILED DEC. 8, 1913. RENEWED JUNE 25, 1919.

1,322,832.

Patented Nov. 25, 1919.
2 SHEETS—SHEET 1.

Inventor:
Tony Selmersheim

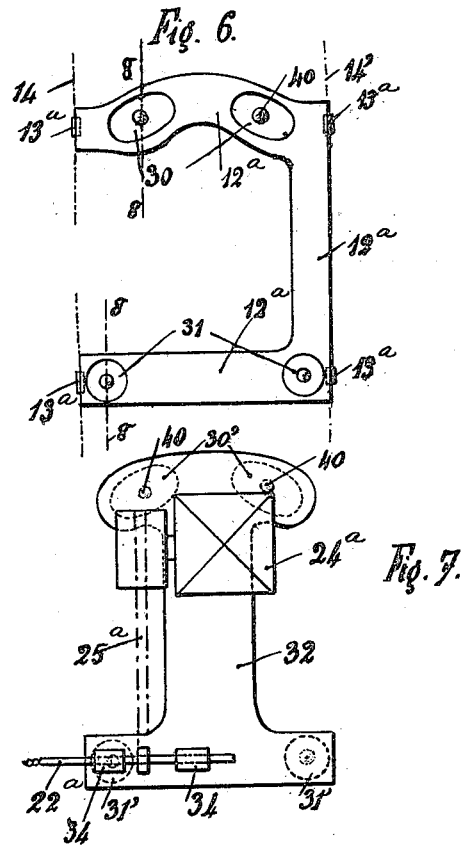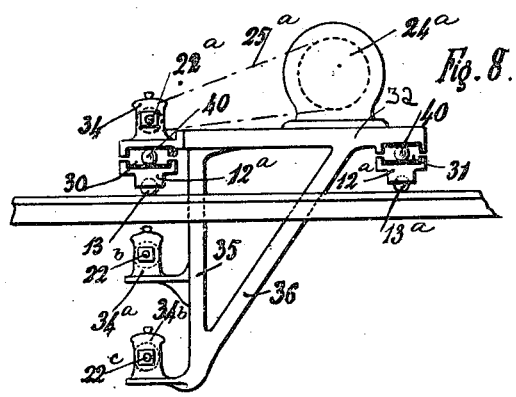

UNITED STATES PATENT OFFICE.

TONY SELMERSHEIM, OF PARIS, FRANCE.

MACHINE FOR REPRODUCING THE CONFIGURATION OF OBJECTS.

1,322,832.   Specification of Letters Patent.   Patented Nov. 25, 1919.

Application filed December 8, 1913, Serial No. 805,472. Renewed June 25, 1919. Serial No. 306,663.

*To all whom it may concern:*

Be it known that I, TONY SELMERSHEIM, a citizen of the Republic of France, residing at Paris, France, 70 Boulevard Garibaldi, have invented certain new and useful Improvements in Machines for Reproducing the Configuration of Objects, of which the following is a specification.

The present invention relates to improvements in carving machines of that type wherein a guide rod or pointer and a cutting tool are supported in such relation as to always travel in parallel paths, whereby duplicates of a carved surface may be produced by guiding the pin or pointer over a suitable model or sample.

Machines of this type, as heretofore constructed, have commonly included means by which the pointer and cutting tool were adapted to travel in straight lines parallel to the face of the work or at right angles thereto. Experience has shown, however, that with such an arrangement an undesirably heavy or great pressure must at times be exerted upon the model or guide and that the cutting tool is frequently caused to assume a position with relation to the work in which it cannot act with its maximum efficiency.

It has also been proposed to so mount the cutting tool and guide pin of a machine of the character referred to that they could be moved freely in all directions in horizontal planes and the object of the present invention is to provide a machine of this particular type in which the parts will be so supported that there will be a minimum amount of resistance to the necessary movements of the tool and guide pin and to provide such a machine with a simple means by which a plurality of duplicates of a model may be simultaneously produced.

In the accompanying drawings,

Fig. 6 is a plan of a slightly modified form of the lower member of the tool carrying table.

Fig. 7 is a plan of the upper member of said table.

Fig. 8 is an elevation and partial section on the lines 8—8 of Fig. 6.

Figure 1:
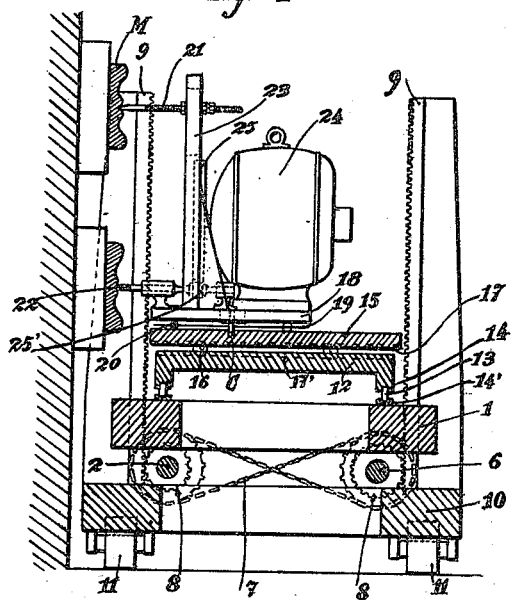
Figure 1 is a view part in elevation and part in section on the line A—A of Fig. 2 of a machine constructed in accordance with the present invention.
Figure 3:
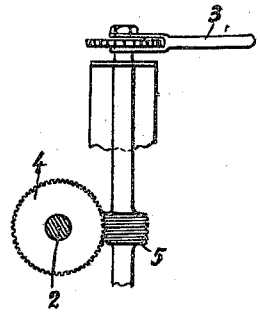
Fig. 3 is a detail of a part of the means provided for effecting vertical adjustment of the supporting frame.
Figure 2:
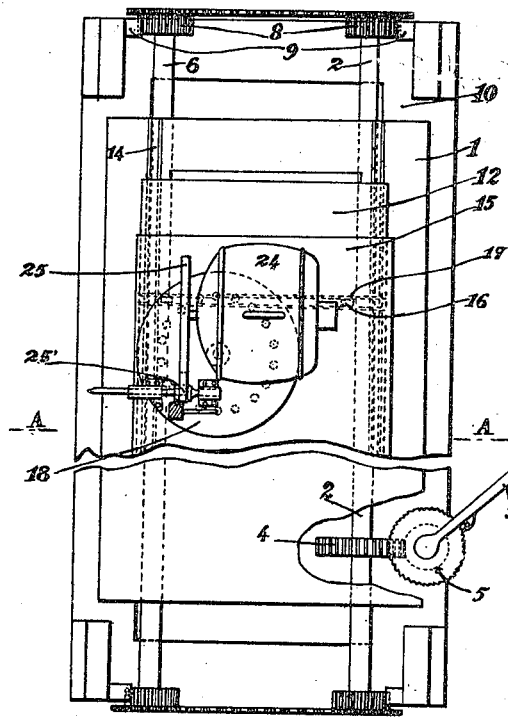
Fig. 2 is a plan view.
Figure 4:
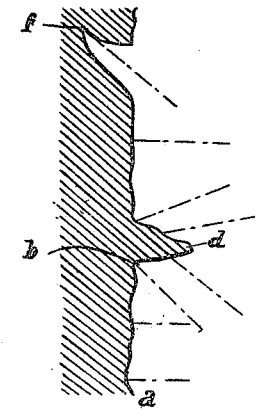
Fig. 4 is a detail plan of the table on which the cutting tool and guide pin are mounted.

Referring to the drawings, and particularly to the form of the invention illustrated in Figs. 1 to 4, it will be seen that the machine comprises a base 10, of rectangular form and mounted upon ground wheels or rollers 11. At the corners of the base are arranged uprights to which are secured vertical racks 9 with which mesh gears 8 on shafts 2, 6, mounted in suitable bearings in a main supporting frame 1. Said shafts are connected by suitable sprockets and chains 7, and to the shaft 2 is secured a worm gear 4 with which meshes a worm 5 on a short vertical shaft mounted in suitable bearings on the base 10, and provided adjacent its upper end with a ratchet. A pawl carried by a hand lever 3 mounted on the upper end of the worm shaft engages said ratchet and by proper manipulation of the handle the shafts 2, 6 will be rotated to effect vertical adjustment of the supporting frame 1 and the parts resting thereon.

On the upper surface of the supporting frame 1 are arranged grooved rails 14', 14', adapted to receive rollers 13 on which rest a table comprising a lower member 12 and an upper member 15. The lower table member 12 is provided with grooved ways 14 which receive the rollers 13 and in its upper surface and the lower surface of the upper table member 15 are formed grooves 17', 17 within which are arranged anti-friction balls or rollers 16 by which the upper table member 15 is supported.

A disk 18 is arranged above the table member 15 being supported by a series of balls 19 having bearings in suitable sockets 20 formed in the lower face of the disk. The disk is provided with a central opening or aperture into which projects a pin or stud C rising from the table member 15. On the disk is mounted the motor 24 and the guide or upright 23 to which is adjustably connected the pointer or guide pin 21. The cutting tool 22 is mounted in suitable bearings on the disk 18 and the shaft thereof is connected with the motor 24 as by a belt connecting pulleys 25, 25'.

Figure 5:
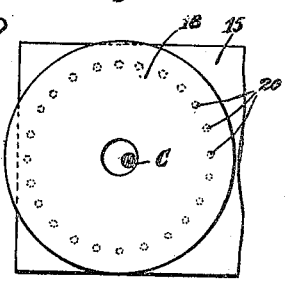
Fig. 5 is a diagrammatic view illustrating the operation of the machine.

It will be seen that by the construction above described the guide pin or pointer 21 and cutting tool 22 are so supported that they can be freely moved in any direction horizontally, the support for said parts turning about the pin C while free to move relative thereto and the table members 12, 15 being adjustable relative to the supporting frame 1 on lines parallel to the face of the model M or the work or on lines at right angles to said faces. The cutting tool is therefore adapted to follow as readily any desired configuration, i. e. to move outwardly to form a projection d or inwardly to provide a socket f, as to form the substantially uniform surface a—b (Fig. 5).

In the form of the invention illustrated in Figs. 6 to 8, the lower table member 12ª is mounted on the supporting frame on balls or rollers 13, 13ª engaging suitable guides on the supporting frame and is preferably made in the form shown. That is, said member is of substantially rectangular outline with one side removed. In the upper face of the lateral arms of said table member are formed recesses 30, 31, the latter being shown as of substantially circular form and the former having elliptical outline.

The upper table member 32 in this embodiment of the invention is of the form shown in Figs. 7 and 8, comprising a central bar-like member and end pieces which project laterally beyond both sides thereof and extend over the end pieces of the lower table member 12ª. Recesses 30', 31', corresponding to and alining with the recesses 30, 31 are formed in the lower surface of the table member 32 and in each of the alined pairs of recesses is arranged an anti-friction ball 40. The balls 40 are of greater diameter than the aggregate depth of the recesses in which they work so that the two table members are held apart and the upper member is readily moved in any horizontal direction.

The upper table member 32 supports the motor 24ª and is also provided with suitable bearings 34 for a cutting tool 22ª. Preferably additional cutters 22ᵇ, 22ᶜ, are mounted in bearings 34ª, 34ᵇ carried by a bracket comprising a vertical arm 35 and an inclined arm 36 which depends from the upper table member 32 and all of said cutting tools are driven from the motor 24ª by suitable belts, one of which is indicated at 25ª.

Having thus described the invention what is claimed and desired to be secured by Letters Patent is:

1. In a machine for the purpose described, the combination with a vertically adjustable supporting frame, of a table supported on said frame by ball bearings permitting it to move horizontally in every direction, each of said bearings comprising a ball and seat independent of the others, a guiding point on said table, a plurality of cutting tools carried by the table, and means for actuating the cutting tools, substantially as and for the purpose specified.

2. In a machine for the purpose described, the combination with a supporting frame, of a table mounted on said frame and comprising two superposed members separated by anti-friction balls each positioned within recesses formed in the adjacent faces of the members and of such dimensions that the upper table member is free to move horizontally in any direction, the recesses receiving each ball being independent of those in which the other balls are arranged, a guiding point on the upper table member, a cutting tool carried by the table, and means for actuating the tool.

3. In a machine for the purpose described, the combination with a supporting frame, of a table mounted to reciprocate on said frame and comprising two superposed members having alined recesses or sockets formed in their adjacent faces, an anti-friction ball arranged within each pair of said recesses, the recesses being of such dimensions that the balls are adapted to move to various positions therein so that the upper table member may be freely adjusted horizontally in any direction, a guiding point on the upper table member, a cutting tool carried by said member, and means for actuating the cutting tool.

4. In a machine for the purpose described, the combination with a supporting frame, of a table mounted to reciprocate on said frame and comprising two superposed members having alined recesses or sockets formed in their adjacent faces, an anti-friction ball arranged within each pair of said recesses, the recesses being of such dimensions that the balls are adapted to move to various positions therein so that the upper table member may be freely adjusted horizontally in any direction, a guiding point on the upper table member, a cutting tool carried by said member, and a motor mounted on said upper table member and connected with the cutting tool.

In testimony whereof, I have hereunto subscribed my name this twenty seventh day of November, 1913.

TONY SELMERSHEIM.

Witnesses:
GEORGES PROTTE,
HANSON C. COXE.